O. W. HINER, D. C. FARNHAM AND E. A. FARNHAM, Jr.
AUTOMATIC STOCK FEEDER.
APPLICATION FILED AUG. 26, 1919.
1,346,025.
Patented July 6, 1920.
2 SHEETS—SHEET 1.
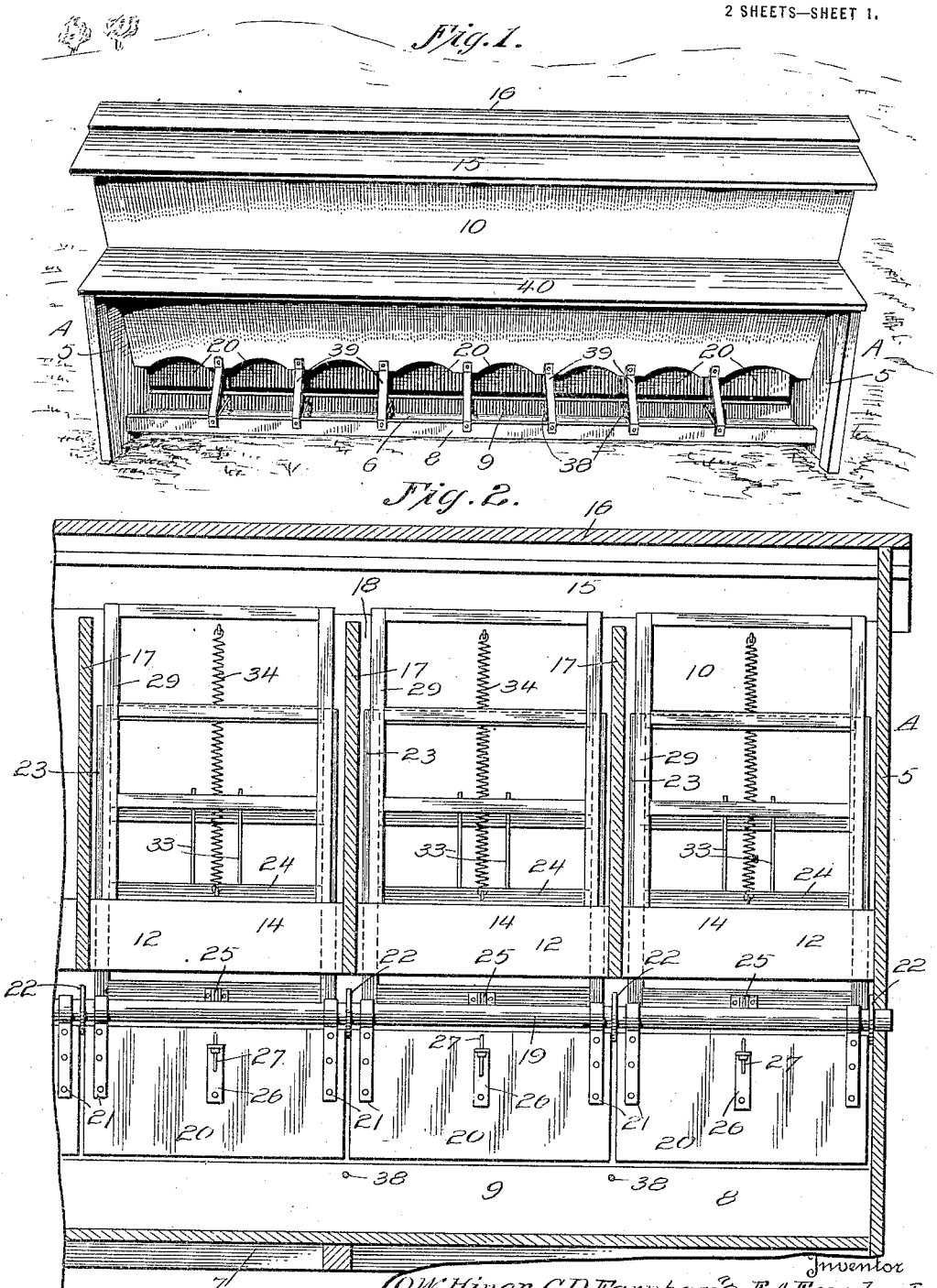

O. W. HINER, D. C. FARNHAM AND E. A. FARNHAM, Jr.
AUTOMATIC STOCK FEEDER.
APPLICATION FILED AUG. 26, 1919.
1,346,025.
Patented July 6, 1920.
2 SHEETS—SHEET 2.
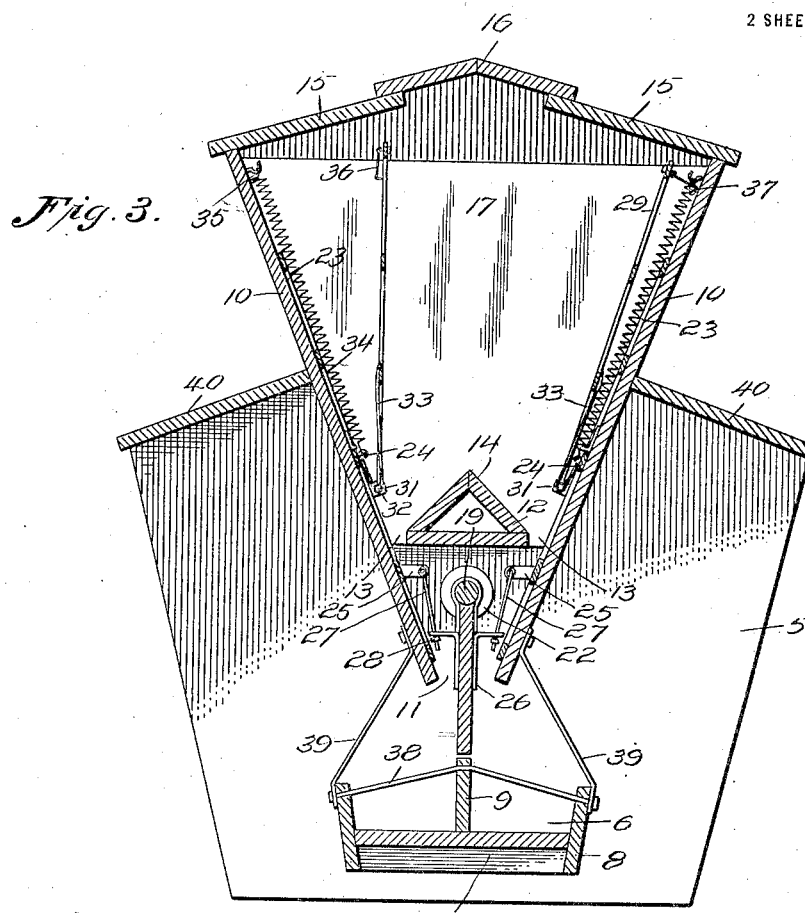
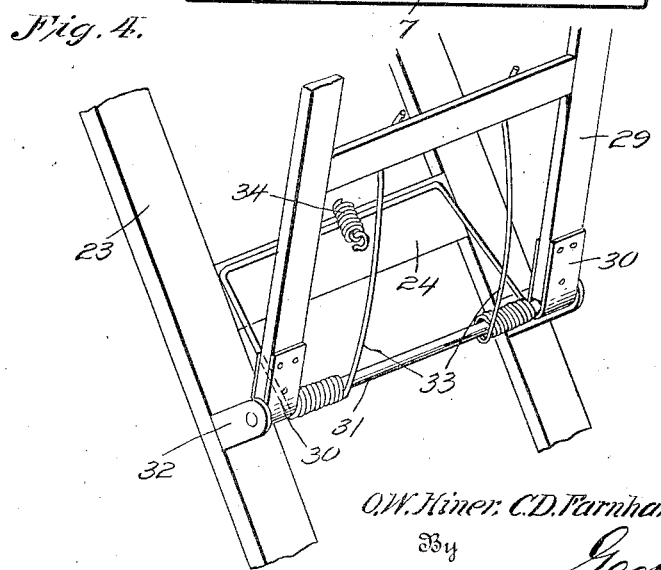

UNITED STATES PATENT OFFICE.

ORA W. HINER, DANA C. FARNHAM, AND ELI A. FARNHAM, JR., OF BUTLER, INDIANA.

AUTOMATIC STOCK-FEEDER.

1,346,025.  Specification of Letters Patent.  Patented July 6, 1920.

Application filed August 26, 1919. Serial No. 319,373.

*To all whom it may concern:*

Be it known that we, ORA W. HINER, DANA C. FARNHAM, and ELI A. FARNHAM, Jr., citizens of the United States, residing at Butler, in the county of Dekalb and State of Indiana, have invented certain new and useful Improvements in Automatic Stock-Feeders, of which the following is a specification.

The invention relates to stock feeding devices, and more particularly to the class of automatic or self feeders for hogs, pigs or other stock.

The primary object of the invention is the provision of a feeder of this character, wherein chopped feed can be conveniently held and automatically delivered to a trough in quantities for the feeding of stock, such as hogs, pigs or the like, without any possibility of the waste of the feed, the feeder being of novel construction to assure the positive feeding of the chop feed from the container therefor and the discharge of such feed being regulated by the stock when eating from the trough of the feeder.

Another object of the invention is the provision of a feeder of this character, wherein the container for the feed has located therein an agitator of a novel construction to assure the positive feeding of the contents in quantities within the trough of the feeder, the agitator being of novel form and is automatic in its action and is controlled by the stock, so that only a sufficient quantity of feed will be delivered to the trough to be consumed by the stock.

A further object of the invention is the provision of a feeder of this character, wherein the construction thereof protects the feed contained therein during inclement weather, to prevent the wetting of the feed, which results in molding thereof or the rotting of the same and also avoids any possibility of the waste of the feed when the feeder is in use.

A still further object of the invention is the provision of a feeder of this character, which is comparatively simple in construction, very reliable and efficient in its purpose, readily and easily portable, accessible to animals from either side of the feeder; strong, durable and inexpensive to manufacture.

With these and other objects in view, the invention consists in the features of construction, combination and arrangement of parts as will be hereinafter fully described, illustrated in the accompanying drawings, and pointed out in the claims hereunto appended.

In the accompanying drawings:

Figure 1 is a perspective view of a feeder constructed in accordance with the invention.

Fig. 2 is a slightly enlarged fragmentary vertical longitudinal sectional view through the feeder.

Fig. 3 is a vertical transverse sectional view thereof.

Fig. 4 is a fragmentary perspective view of the agitator.

Similar reference characters indicate corresponding parts throughout the several views in the drawings.

Referring to the drawings in detail, the feeder comprises a body or frame A, including spaced vertical ends 5, preferably of the shape shown having disposed therebetween a relatively long trough 6 supported upon cleats 7 fixed to the inner faces of the ends spaced from the lower edges thereof, the side walls 8 of the trough 6 being arranged in outwardly divergent relation to each other while centrally within said trough and longitudinally thereof is a dividing wall or partition 9 separating the trough into independent feeding spaces at opposite sides thereof to be accessible to stock when standing on either side of the frame A of the feeder.

Suitably mounted in the frame A between the ends 5 thereof above the trough 6 is a hopper shaped bin or feed container 10 which is formed with an opening 11 at its lowermost portion and extends throughout the length of the trough 6 for the delivery of the contents of the bin or container 10 into said trough. Located interiorly of the bin or container 10 spaced from the opening 11 in the lower portion thereof and extending longitudinally centrally of the same is a false bottom 12 providing at opposite sides thereof discharge slots 13, the bottom 12 being formed with angularly disposed sides or walls 14 which are reversely inclined with respect to each other for directing the contents of the bin or container 10 to both of the discharge slots 13 on opposite sides of the bottom 12 for the delivery of the contents through the opening 11 into the trough 6 in the use of the feeder.

The bin or container 10 has fitted thereon a crowned roof 15 which slopes in opposite directions and has a crown 16, the sections of the roof 15 being removable to permit access to the bin or container 10 for the introduction of feed therein. This roof 15 will shed water so as to exclude the same from the interior of the bin or container 10 during inclement weather. Located interiorly of the bin or container 10 at intervals throughout the length of the same are spaced transverse partitions or dividing walls 17 which separate said bin or container 10 into independent compartments 18, so that the feed in the compartments will be delivered to the trough 6 therefrom independently of each other, the dividing walls or partitions 17 being cut in a manner to bridge the false bottom 12 and the deflector walls 14 thereof as will appear in Fig. 3 of the drawings.

Mounted within the ends 5 of the frame A below the false bottom 12 centrally thereof is a longitudinal pivot shaft or rod 19 upon which are swingingly supported depending nose or head boards or sections 20, each being fitted with strap hangers 21 loosely embracing the rod 19 for the hanging of the board or section 20 therefrom in proper position normally in vertical alinement with the partition 9 in the trough 6, while surrounding the shaft or rod 19 between the sections 20 are spacer disk washers 22 which sustain said boards or sections 20 in their proper separated relation to each other when suspended from the rod or shaft 19 above the trough of the feeder.

Located within the bin or container 10 is an agitator mechanism for the feed, there being a pair of agitators for each compartment 18 comprising skeleton slides, each including spaced longitudinal side rails 23 and cross rungs or webs 24, which are integral with the side rails or made separate therefrom and fastened thereto in any suitable manner. These slides are located in each compartment 18 on the inner faces of opposite sides thereof for up and down movement thereon. Carried by the opposed pair of slides spaced from the lower ends thereof are suitable brackets 25, while fixed to the head or nose board or section 20 adjacent thereto and on opposite sides of the same are inverted substantially L-shaped brackets 26 and to the said brackets 25 at their free ends are pivoted links or connecting stems 27, the same being passed through the brackets 26 at the free arms thereof and carry adjusting nuts 28 for connecting the links or stems 27 to the brackets 26. It will be seen that on the rocking of the head or nose board 20 through the medium of the links or stems 27 the slide will be alternately moved in the bin or container 10, and these slides act as agitators within the compartment 18 for the positive feeding of chopped feed therein through the discharge slots 13 and opening 11 into the trough on opposite sides of the head or nose board 20 to be delivered into the trough to either side of the bin therein so that the feed can be consumed by an animal when standing at either side of the feeder or the trough 6 thereof.

Carried by each slide is a swinging follower wing in the form of an open frame 29 having on the side members thereof at their ends next to the slide pivot straps 30 receiving a pivot 31 which is journaled in bearings 32 on the slide and in this manner the follower 29 is swingingly connected to said slide. Mounted upon the pivot 31 is a tension spring 33 which has its ends engaged with the slide and the follower respectively, the spring 33 being designed to move the follower 29 outwardly away from the slide to act upon the feed within the compartment 18 within the bin or container 10 to force said feed downwardly therein. It will be apparent that the follower 29 moves with the slide so that it coöperates therewith to act as an agitator for the feed within the compartment 18 to assure the positive feeding of the chopped feed within the bin or container 10 when the feeder is in use.

Connected with one of the cross rungs or webs 24 of the slide at an intermediate point thereof is one end of a coiled retractile spring 34, which has its opposite end engaged with a hook 35 mounted in the bin near the upper end thereof or adjacent to the roof 15 thereof, the spring 34 being designed to normally retract the slide or move the same to a position elevated within the bin or container 10. The springs 34 on the pair of slides within each compartment 18 will exert an upward pressure on the brackets 26 when the head or nose board 20 hangs vertically. Then when the board 20 is swung in one direction, one spring will be positively stretched, and the other spring, relieved from part of the weight on it, will raise the agitator attached thereto. When the animal withdraws its nose from the trough the agitator which has previously been raised as explained will descend to its former position, yet on displacement of the nose or head board 20 laterally to either side of the trough 6 either of the slides within the compartment 18 will be moved against the resistance of the retractile spring 34 for agitating the contents of the bin or container 10 and positively move the feed within the compartment 18 therein for the delivery of the same through the discharge slots 13 and opening 11 into the trough 6 of the feeder. Thus in this manner by the use of the agitators there is no possibility of the feed within the compartments 18 becoming clogged or choked in the discharge slots 13 and opening 11 or the banking of the feed within said compartment, there being a positive feed of the contents from the bin or container 10 into the trough 6 when the agitator mechanism is active and this agitator mechanism is actuated by the nose or head board when operated by the stock.

Each follower 29 at its upper free end has connected thereto a swinging hook 36 adapted for detachable engagement with a keeper 37 mounted in each side wall of the bin or container 10 so that the follower 29 can be positioned as shown at the right hand side of Fig. 3 of the drawing when it is desired to introduce feed within the bin or container 10, without interfering with the introduction of the feed therein. After the bin or container 10 has been filled with feed the followers 29 are released from their open position by disengaging the hook 36 from the keeper 37 and the springs 33 will become active upon said followers to move the same toward each other for exerting pressure upon the feed within the respective compartments 18 in the bin or container 10 to assure the positive delivery of the feed therefrom into the trough 6 when one or any number of the head or nose boards 20 are moved by the stock for the automatic delivery of quantities of feed into the trough 6 to be consumed by the stock.

Passed at intervals through the dividing wall 9 in the trough 6 are transverse tie rods 38 which are engaged in the sides 8 of said trough and also engaged in braces 39 which are fixed to the sides of the bin or container 10, thus it will be seen that these tie rods 38 and braces 39 separate the trough into feeding spaces.

It will be apparent that there is no possibility of waste of the feed delivered from the bin or container 10 into the trough 6 and the feed is delivered to either side of the trough which is accessible to the animal from either side of the feeder. It will be apparent that the agitator means at opposite sides of the container tend or serve to alternately discharge feed into different sections of the trough. The quantity of feed delivered to the trough 6 of the feeder is controlled by the animal when contacting with the head or nose board 20 which is adapted to be swung thereby to either side of the feeder and during this swinging movement of the board or section 20 the feed is automatically delivered from the bin or container 10 into the trough.

The ends 5 of the frame A have mounted thereon cover sections or boards 40 which overhang the trough 6 so as to exclude rain, sleet or snow therefrom, thereby shielding the trough during inclement weather.

It is of course understood that any number of compartments 18 may be provided in the bin or container 10. It also will be obvious that the feed in the respective compartments 18 will be individually delivered therefrom without any disturbance of the feed in the other compartments, as the feed of the contents of the compartments is regulated by the action of each head section 20, because the action of one of the same does not in any manner disturb the others, thus it is seen that when feed is delivered from one of the compartments the others are inactive for delivery of feed therefrom into the trough 6 of the feeder.

From the foregoing it is thought that the construction and manner of operation of the feeder will be clearly understood and therefore a more extended explanation has been omitted.

What is claimed is:

1. A feeder of the character described, comprising a trough, a container above the trough, means within the container to provide plural discharge openings and deflectors to direct the contents into the openings, a head board swingingly supported beneath said means and actuated from either side of the trough by an animal, whereby the contents of the container will discharge through one opening at one side of the board and the other opening at the opposite side thereof, and duplicate agitator means within the container and operated by movement of the head board.

2. A feeder of the character described, comprising a trough, a container above the trough, means within the container to provide plural discharge openings and deflectors to direct the contents into the openings, a head board swingingly supported beneath said means and actuated from either side of the trough by an animal, whereby the contents of the container will discharge through one opening at one side of the board and the other opening at the opposite side thereof, duplicate agitator means within the container and operated by movement of the head board, and means active upon the duplicate agitators to sustain the head board normally in neutral position centrally of the trough.

3. A feeder of the character described, comprising a trough, a container above the trough, means within the container to provide plural discharge openings and deflectors to direct the contents into the openings, a head board swingingly supported beneath said means and actuated from either side of the trough by an animal, whereby the contents of the container will discharge through one opening at one side of the board and the other opening at the opposite side thereof, duplicate agitator means within the container and operated by movement of the head board, means active upon the duplicate agitators to sustain the head board normally in neutral position centrally of the trough, and a central division wall within the trough and rising vertically from its bottom to a distance in close proximity to the free end of the head board.

4. In a feeder, a bin having compartments formed with outlets at its bottom, a trough beneath the outlets, agitator slides in each compartment and having spring pressed followers, a head board supported beneath each compartment and connected with the slides to alternately operate the same, and a dividing wall in the trough to provide feed spaces on opposite sides of the same.

5. In a feeder, a bin having compartments formed with outlets at its bottom, a receiver beneath the outlets, agitator slides in each compartment and having spring pressed followers, a head board supported beneath each compartment and connected with the slides to alternately operate the same and controlled by an animal, a dividing wall in the trough to provide feed spaces on opposite sides of the same, and means active upon the agitator slides to sustain the head board in substantial vertical alinement with the dividing wall in the trough.

6. In a feeder of the character described, a frame, a substantially hopper shaped container in said frame and having discharge openings in its lowermost portion, vertical transverse partitions within said container for dividing it into independent compartments, a trough in the frame and spaced beneath the said container, a false bottom within the container remote from the discharge opening and forming slots on opposite sides thereof, a shaft mounted in the ends of the container immediately beneath the false bottom, head boards for the respective compartments swingingly supported by said shaft, and adapted to direct the contents from the container alternately on either side of the center of said trough, and agitating mechanisms interiorly of the container and actuated by the head boards.

7. In a feeder of the character described, a frame, a substantially hopper shaped container in said frame and having discharge openings in its lowermost portion, vertical transverse partitions within said container for dividing it into independent compartments, a trough in the frame and spaced beneath the said container, a false bottom within the container remote from the discharge opening and forming slots on opposite sides thereof, a shaft mounted in the ends of the container immediately beneath the false bottom, head boards for the respective compartments swingingly supported by said shaft, and adapted to direct the contents from the container alternately on either side of the center of said trough, and agitating mechanisms interiorly of the container and actuated by the head boards, and pivotally supported followers coacting with the agitator mechanism.

In testimony whereof we affix our signatures hereto.

ORA W. HINER.
DANA C. FARNHAM.
ELI A. FARNHAM, Jr.